United States Patent
Baumann et al.

(10) Patent No.: US 8,113,336 B2
(45) Date of Patent: Feb. 14, 2012

(54) AUTOMATED MANIPULATOR SYSTEM TO SEPARATE BUNDLES, AND METHOD FOR THE OPERATION THEREOF

(75) Inventors: Michael Baumann, Unterfoehring (DE); Christian Wurll, Peachtree City, GA (US)

(73) Assignee: Kuka Roboter GmbH, Augsburg (DE)

( * ) Notice: Subject to any disclaimer, the term of this patent is extended or adjusted under 35 U.S.C. 154(b) by 162 days.

(21) Appl. No.: 12/715,460

(22) Filed: Mar. 2, 2010

(65) Prior Publication Data
US 2010/0219043 A1    Sep. 2, 2010

(30) Foreign Application Priority Data
Mar. 2, 2009    (DE) .................. 10 2009 011 302

(51) Int. Cl.
B65G 47/31    (2006.01)
(52) U.S. Cl. ............... 198/460.1; 198/461.1; 198/461.3
(58) Field of Classification Search .............. 198/460.1, 198/461.1, 461.3, 617
See application file for complete search history.

(56) References Cited

U.S. PATENT DOCUMENTS

| | | | | |
|---|---|---|---|---|
| 5,641,053 A | * | 6/1997 | Nannini et al. | 198/461.1 |
| 5,915,523 A | * | 6/1999 | Spatafora | 198/461.3 |
| 6,098,785 A | * | 8/2000 | Van Maanen | 198/461.1 |
| 6,471,044 B1 | * | 10/2002 | Isaacs et al. | 198/460.1 |
| 6,812,426 B1 | * | 11/2004 | Kotowski et al. | 198/460.1 |
| 7,896,151 B2 | * | 3/2011 | Meisinger | 198/461.1 |

FOREIGN PATENT DOCUMENTS

| | | |
|---|---|---|
| DE | 220 948 A1 | 4/1985 |
| DE | 100 51 932 A1 | 5/2002 |
| DE | 201 08 401 U1 | 10/2002 |

* cited by examiner

Primary Examiner — James R Bidwell
(74) Attorney, Agent, or Firm — Schiff Hardin LLP

(57) ABSTRACT

In a method to separate bundle layers by way of a first conveyor track and a second conveyor track whose conveyor speed is greater than the conveyor speed of the first conveyor track, bundles are spaced apart from one another in the transport direction by a speed jump between the first conveyor track and second conveyor track; positions of bundles on the second conveyor track that are spaced apart from one another are detected by a position detection device. The bundles are moved from the second conveyor track with a manipulator, wherein the manipulator is controlled on the basis of the detected bundle positions on the second conveyor track.

12 Claims, 3 Drawing Sheets

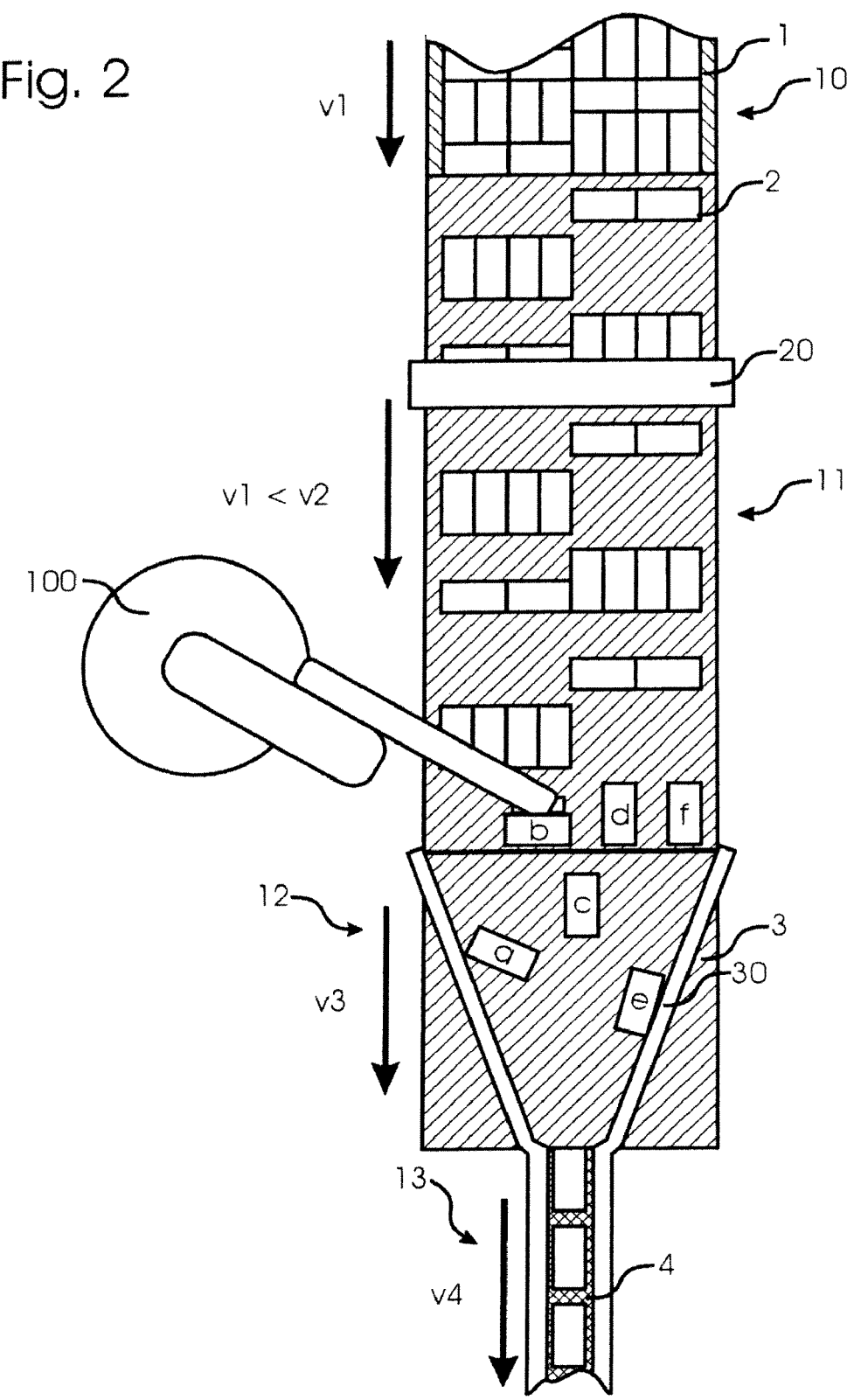

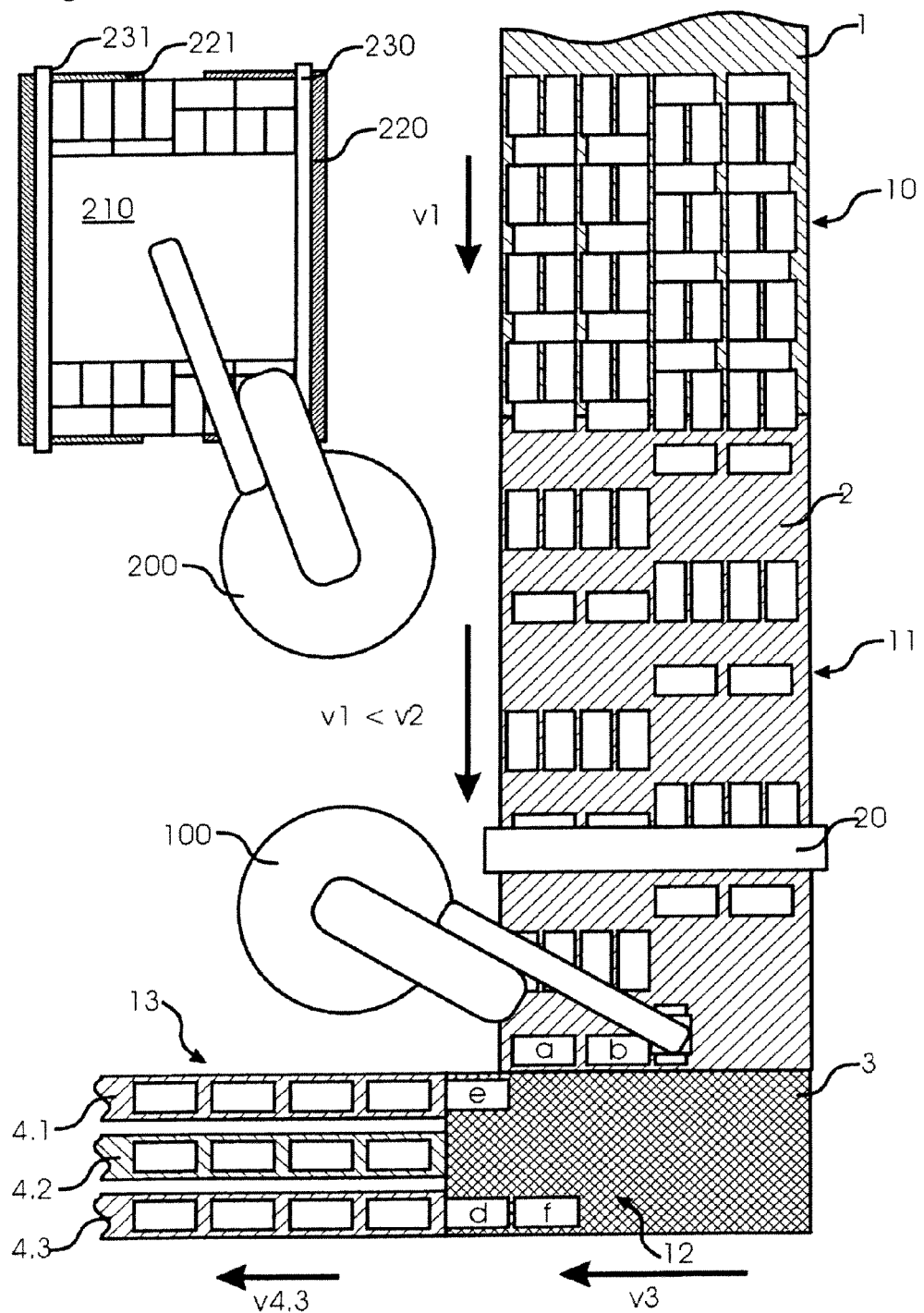

AUTOMATED MANIPULATOR SYSTEM TO SEPARATE BUNDLES, AND METHOD FOR THE OPERATION THEREOF

BACKGROUND OF THE INVENTION

1. Field of the Invention

The present invention concerns a method and a manipulator to separate bundle layers from a stack.

2. Description of the Prior Art

In many fields, goods bundles—that, for example, can be bound in containers or by packing means or packing aids (such as films)—and/or individual goods are combined into one or more bundle layers stacked atop one another for transport, storage, sale or the like. Individual goods and goods bundles are uniformly designated as bundles in the following.

Such compact bundle layers must be separated again at various points in the chain of the flow of goods, for example in order to consign multiple homogeneous bundle layers with the same bundles of mixed bundle series or layers.

To separate bundles, it is known (for example from DE 100 51932 A1) to subject the bundles to a speed jump at the transition between two conveyor belts. The downstream conveyor thereby exhibits a higher conveyor speed, such that the bundles are accelerated in the conveyor direction. DD 220 948 A1 discloses multiple speed gradations and synchronization around a corner in order to separate bundles into two directions at right angles to one another.

This type of separation decisively depends on the friction between the bundle and conveyor path. Such systems are therefore not only prone to error (for example due to vibrations, contamination or disadvantageous contact surfaces, such as PETs with star-shaped surfaces), but they also must normally be individually adjusted and calibrated differently depending on the bundles to be separated, which makes flexible logistics more difficult. In addition, bundles that are shifted on conveyors by guide edges transverse to the transport direction (for example that are collected into a row by channels tapering in the transport direction) tend to cant or jam at the guide edges.

From DE 201 08 401 U1, for example, it is known to separate bundles by means of automated manipulators. Position inaccuracies of the gripped bundles must disadvantageously be accepted, which is problematic for bundle layers delivered on conveyors due to the relative displacements of adjacent bundles that occur there.

SUMMARY OF THE INVENTION

An object of the present invention is to improve the separation of bundle layers, starting from DD 220 948 A1.

According to the invention, bundle rows with one or more bundles of a bundle layer that are arranged next to one another are initially spaced apart from one another in the transport direction by one or more speed jumps between two or more conveyor tracks. The conveyor tracks can be continuous or cycled continuous conveyors such as conveyor bands, belts or aprons.

It is thereby possible to detect the positions of bundles or bundle rows that are now separated from one another on a second conveyor track with sufficient exactness with a position detection device. The position detection device can, for example, be formed with one or more optical sensors (in particular laser sensors) or cameras and detects the position or positions of bundles on the second conveyor track by means of a pattern recognition method or an incident light or a transmitted light method, or the like. Ultrasound sensors, other contact-less sensors (for example Reed contacts) or contact sensors are also similarly suitable.

On the basis of the bundle positions detected in this way (which for this purpose are spaced apart from one another by the speed jump) on the second conveyor track it is now possible to precisely control a manipulator access and thus to move bundles from the second conveyor track with a manipulator.

Jamming of bundles (for example at guide edges) can be prevented by the manipulator and the active progressive motion of the bundles from the second conveyor track. Additionally, the bundles can be moved specifically by the manipulator, for example be shifted or raised from the second conveyor track, wherein the manipulator can advantageously change the orientation of some or all bundles when it moves them from the second conveyor track. For example, longitudinally or transversally situated bundles of a bundle row can hereby be transferred with the same orientation from the second conveyor track. All bundles of a bundle row can be moved by the manipulator from the second conveyor track, individually, together or in groups. Some bundles of the bundle row—in particular those that do not need to be reoriented or for which there is no danger of jamming—can similarly also be deposited by the second conveyor track without intervention of the manipulator, which can reduce the required manipulator movement and thus increase the throughput.

In a preferred embodiment, the manipulator moves bundles from the second conveyor track onto a third conveyor track whose conveyor direction is advantageously oriented essentially parallel to or essentially at a right angle to the conveyor speed of the second conveyor track. Naturally, other angles between the conveyor speeds of the second conveyor track and third conveyor track are also possible.

Bundles that are oriented differently on the second conveyor track can also be placed with the same orientation on the third conveyor track via the movement of the bundle according to the invention by means of manipulators. Additionally or alternatively, it is possible to distribute bundles transversal to the third conveyor speed via the manipulator in order, for example, to distribute them on different further conveyor tracks depending on their position transversal to the third conveyor speed and thus to mix or, respectively, consign bundles.

Bundles are preferably placed spaced apart from one another on the first conveyor track, transverse to its conveyor direction. This can ensue, for example, by a suitably cycled adjustment at a corner. This can also ensue, by the placement of a bundle layer by means of an additional manipulator whose gripper possesses support floors and stops that can be moved relative to these support floors, wherein a relative movement between support floors and stops on the one hand and a movement of the support bases relative to the first conveyor track on the other hand is synchronized such that the bundles are spaced apart from one another transversal to the conveyor direction of the first conveyor track.

The positions of bundles spaced apart from one another on the second conveyor track are preferably detected only near the manipulator in order to avoid or to keep small any position change between the detected position and the position at the manipulator access (due to vibrations of the second conveyor track or the like). This also allows an inertia-dependent relative movement after the speed jump decline. The position detection can ensue, for example, essentially at a distance from a point of the second conveyor track at which the last bundle of a bundle row is taken up (i.e. lifted or shifted) by the manipulator that corresponds to the quotient of conveyor speed of the second conveyor track and the time that the manipulator requires until taking up the last bundle. The last bundle then reaches its access position precisely when the manipulator is ready to access it.

A manipulator according to the invention has a manipulator controller that determines access positions on the basis of the detected bundle positions on the second conveyor track. This manipulator controller can be implemented in the control device (which activates the drives (actuators) of the manipulator), or can be upstream of the control device.

BRIEF DESCRIPTION OF THE DRAWINGS

FIG. 2 schematically illustrates a system to separate bundle layers in the execution of the method according to another embodiment of the present invention.

FIG. 3 schematically illustrates a system to separate bundle layers in the execution of the method according to another embodiment of the present invention.

DESCRIPTION OF THE PREFERRED EMBODIMENTS

Figure 1:
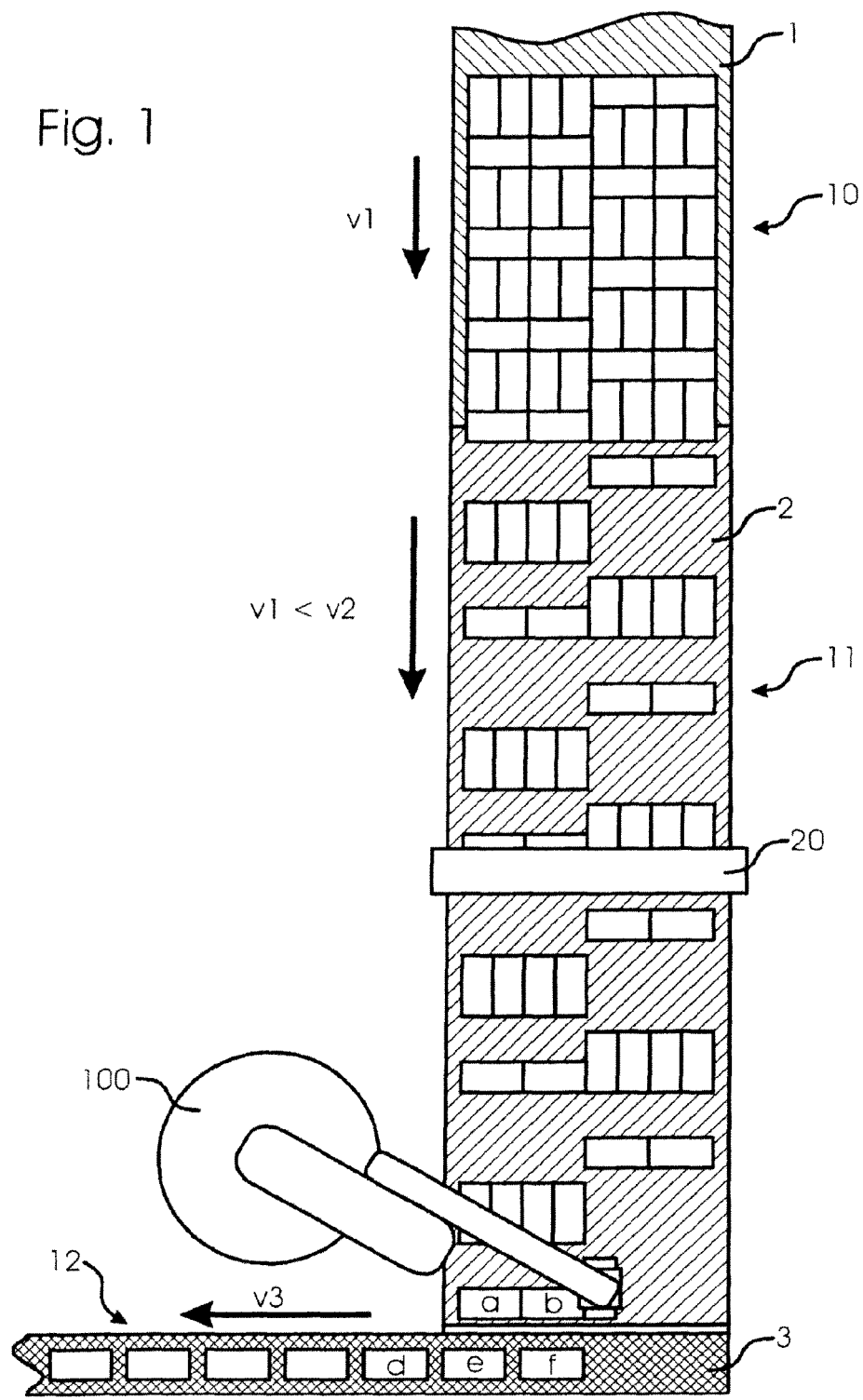
FIG. 1 schematically illustrates a system to separate bundle layers in the execution of the method according to an embodiment of the present invention.

FIG. 1 shows a system to separate bundle layers in the execution of a method according to the present invention. It has a first conveyor track in the form of a continuous or cycled conveyor belt 1 with a first conveyor speed v1 (that, in FIG. 1, is indicated by an arrow). A densely packed bundle layer 10 is placed on this conveyor track by means of a manipulator or other conveyor (not shown).

In the transport direction (from top to bottom in FIG. 1), the first conveyor track 1 is downstream of a second conveyor track in the form of a continuous or cycled conveyor belt 2 whose conveyor speed v2 is greater than the first conveyor speed (v2>v1). The previously compact bundle layer 10 is drawn row-by-row (i.e. one-dimensionally in the transport direction) by this speed jump v1→v2.

The positions of the bundles of this separated bundle layer 11 are detected by a sensor system 20 (which is possible in a particularly simple and precise manner due to its distance from bundle rows that are adjacent in the transport direction due to the preceding speed jump) and relayed to a controller of an articulated arm robot 100. This determines access positions for the manipulator from these positions, taking into account the second conveyor speed v2.

The manipulator 100 respectively grips one or more bundles of a bundle row (which is likewise possible particularly well due to its spacing from adjacent bundle rows) and transfers these to a third conveyor track 3 whose conveyor speed (direction) v3 is oriented at a right angle to the second conveyor speed v2. While bundles a, b that are already orientated parallel to the third conveyor speed v2 are not moved onto the third conveyor track by the manipulator 100 (or in any case are moved without reorientation), the manipulator 100 rotates bundles d, e, f that are still orientated transversal to the third conveyor speed v3 on the second conveyor track by 90° upon transfer so that all bundles on the third conveyor track 3 exhibit the same orientation. A predetermined distance between bundles of the bundle series 12 in the transport direction of the third conveyor track 3 can additionally be set by appropriate selection of the placement positions on the third conveyor track.

The position detection device 20 is spaced from the access position of the last bundle a gripped in a row, on the downstream edge of the second conveyor track, so far that this bundle a reaches its access position with the conveyor speed v2 precisely when the manipulator is ready to take it up. In this way the interval between position detection and access is minimized, which minimizes the risk of a position change between detection and access.

FIG. 2 shows a different system to separate bundle layers in the execution of a method according to the present invention. Elements that are identical with the system according to FIG. 1 that was explained in the preceding are designated with the same reference characters, such that only the differences regarding these are discussed in the following.

In the system according to FIG. 2, the conveyor speeds v2, v3, v4 of the second, third conveyor track and a fourth conveyor track 2, 3, 4 are parallel. Guide edges 30 tapering towards one another in the transport direction on the third conveyor track 3 center the bundles on the third conveyor track 3 transversal to their conveyor speed v3.

Without the use of the manipulator 100 according to the invention, the danger exists that the bundles of a bundle row cant or, respectively, jam with one another upon entrance into the funnel formed by the guide edges 30. Therefore the manipulator 100 shifts individual bundles from the second conveyor track to the third conveyor track. It is recognizable in FIG. 2 that it has initially shifted the bundle e, next the bundle a and then the bundle c onto the third conveyor track at the downstream edge of the second conveyor track 2. It has hereby achieved gaps in the compact bundle row so that the danger of a jam within a bundle row is reduced. While the manipulator in the exemplary embodiment of FIG. 2 shifts the bundles without changing orientation onto the third conveyor track 3, in a modification (not shown) it can reorient individual bundles (as in the exemplary embodiment of FIG. 1), for example the bundles a, b oriented transversal to the third conveyor speed v3, and thus further reduce the danger of a canting at the guide edges 30. In a further modification (not shown), it can similarly also thus slide (shift) or place individual bundles so that they are already essentially oriented towards the entrance to the fourth conveyor track 4, and thus even further reduce the danger of a canting at the guide edges 30.

FIG. 3 shows a different system to separate bundle layers in the embodiment of a method according to the present invention. Elements that are identical to the system according to FIG. 1 that was explained above are designated with the same reference characters, such that again only the differences regarding these are discussed in the following.

In the system according to FIG. 3, the bundle layers are already separated by an additional manipulator upon placement, transversal to their transport direction) on the first conveyor track 1. For this, support floors 220, 221 of a gripper 210 of the manipulator 200 initially slide under the uppermost bundle layer(s) of a bundle layer stack that are then additionally clamped by movable stops 230, 321. Upon placement on the first conveyor track 1, the support floors 220, 221 separate more quickly from one another than the stops 230, 231 that are synchronized with these. A bundle row (bundles in the transport direction of the conveyor track 1) is thereby placed when a support floor 220, 221 is driven correspondingly far forward relative to the stop 230 or, respectively, 231. By the additional movement of the support floor between the placement of adjacent rows, a spacing of the bundle rows transversal to the transport direction ensues on the first conveyor track 1.

This bundle layer 10 transverse to the transport direction is subsequently also drawn in the transport direction (as described with reference to FIG. 1), wherein positions of the bundles in this two-dimensionally drawn-out bundle layer 11 are detected by the sensor system 20. On the basis of these detected positions, the controller of the manipulator 100 determines access positions to take up individual bundles. The drawing in and transversal to the transport direction similarly facilitates the position detection and the access of the manipulator 100.

From the third conveyor track 3, the bundles are distributed transversal to the conveyor speed v3 on parallel conveyor belts 4.1, . . . , 4.3 depending on their position: if a bundle in FIG. 3 is arranged at the top (center/bottom) on the conveyor belt 3, it is output onto the upper (center/bottom) conveyor belt 4.1 (4.2/4.30.

In that the manipulator 100 correspondingly positions the bundles transversal to the conveyor speed v3 on the conveyor belt 3, the division of the bundles of a bundle row onto the fourth conveyor tracks 4.1, . . . , 4.3 can be provided.

The manipulator 100 in FIG. 3 thus has placed the first and third (from the right) bundles f, d of the downstream bundle row (see notation in FIG. 1, 2) below on the third conveyor belt 3, such that they can be supplied to the lower fourth conveyor belt 4.3. Via corresponding positioning of the bundles f, d in the transport direction of the third conveyor belt 3 by the manipulator 100, a distance between these bundles can also thereby be set, which enables a very flexible separation (in particular a synchronized separation to the three conveyor belts 4.1, . . . , 4.3) in connection with a corresponding conveyor speed v4.3 of this conveyor track.

The manipulator 100 has shifted the second bundle e from the right upward onto the third conveyor belt 3, wherein the infeed to the fourth conveyor belt 4.1 (in particular relative to the infeed of the bundles f, d on the fourth conveyor belt 4.3) can be predetermined via corresponding positioning in the transport direction of the third conveyor belt 3.

Although modifications and changes may be suggested by those skilled in the art, it is the intention of the inventors to embody within the patent warranted hereon all changes and modifications as reasonably and properly come within the scope of his or her contribution to the art.

We claim as follows:

1. A method for separating bundles in a layer comprising the steps of:
    placing bundles in a layer on a first conveyor track and conveying said bundles on said first conveyor track onto a second conveyor track;
    operating said first conveyor track at a first conveyor track speed and operating said second conveyor track at a second conveyor track speed that is faster than said first conveyor track feed, to produce a speed jump between said first conveyor track and said second conveyor track that spaces said bundles apart as said bundles transfer from said first conveyor track to said second conveyor track;
    with a position detection device, detecting respective positions of the bundles on the second conveyor track that have been spaced apart from each other, and generating a position signal indicating the respective positions; and
    supplying said position signal to a computerized control unit of an automated manipulator and controlling said automated manipulator from said control unit dependent on said respective bundle positions to engage and move the bundles from the second conveyor track with the automated manipulator.

2. A method as claimed in claim 1 comprising providing a third conveyor track and moving said bundles with said automated manipulator from said second conveyor track onto said third conveyor track.

3. A method as claimed in claim 2 comprising orienting said third conveyor track with an orientation relative to said second conveyor track selected from the group consisting of a parallel orientation and a right angle orientation and a right angle orientation.

4. A method as claimed in claim 1 comprising controlling said automated manipulator with said control unit to distribute said bundles transversely to a conveyor direction of said third conveyor track.

5. A method as claimed in claim 2 comprising providing a plurality of fourth conveyor tracks, and distributing said bundles from said third conveyor track among said fourth conveyor tracks.

6. A method as claimed in claim 1 comprising moving said bundles with said automated manipulator from said second conveyor track by implementing a manipulator movement selected from the group consisting of shifting said bundles and lifting said bundles.

7. A method as claimed in claim 1 comprising operating said automated manipulator, when moving said bundles from said second conveyor track, to change an orientation of said bundles.

8. A method as claimed in claim 1 comprising placing said bundles at a distance from each other on said first conveyor track.

9. A method as claimed in claim 1 comprising, with said optical detection device, detecting said respective positions of said bundles by an optical detection technique selected from the group consisting of image recognition, reflection of incident light by said bundles, and reflection of transmitted light by said bundles.

10. A method as claimed in claim 1 comprising detecting said respective positions of said bundles with said position detection device in proximity to said automated manipulator.

11. An automated manipulator system comprising:
    an automated manipulator;
    a control unit that operates said automated manipulator
    a conveyor system comprising a first conveyor track and a second conveyor track, with bundles in a layer placed on said first conveyor track and said first conveyor track conveying said bundles on said first conveyor track onto said second conveyor track;
    said first conveyor track being operated at a first conveyor track speed and said second conveyor track being operated at a second conveyor track speed that is faster than said first conveyor track feed, to produce a speed jump between said first conveyor track and said second conveyor track that spaces said bundles apart as said bundles transfer from said first conveyor track to said second conveyor track;
    a position detection device that detects respective positions of the bundles on the second conveyor track that have been spaced apart from each other, and generating a position signal indicating the respective positions; and
    said position signal being supplied to said control unit and said control unit being configured to control said automated manipulator dependent on said respective bundle positions to engage and move the bundles from the second conveyor track with the automated manipulator.

12. A non-transitory computer-readable medium encoded with programming instructions, said medium being loaded into a computerized control unit of an automated manipulator system, that includes an automated manipulator operated by the control unit, and a conveyor system having a first conveyor track and that conveys said bundles on said first conveyor track onto a second conveyor track, said first conveyor track being operated at a first conveyor track speed and said second conveyor track being operated at a second conveyor track speed that is faster than said first conveyor track feed, to produce a speed jump between said first conveyor track and said second conveyor track that spaces said bundles apart as said bundles transfer from said first conveyor track to said second conveyor track, said programming instructions causing said control unit to:

operate a position detection device to detect respective positions of the bundles on the second conveyor track that have been spaced apart from each other, and to generate a position signal indicating the respective positions, supplied to said control unit; and control said automated manipulator from said control unit dependent on said respective bundle positions to engage and move the bundles from the second conveyor track with the automated manipulator.

\* \* \* \* \*